United States Patent [19]

Tawfik et al.

[11] 4,171,539

[45] Oct. 16, 1979

[54] POWER STROBED DIGITAL COMPUTER SYSTEM

[75] Inventors: David A. Tawfik, Fort Lee; Martin W. Feintuch, Paramus, both of N.J.

[73] Assignee: The Bendix Corporation, Teterboro, N.J.

[21] Appl. No.: 861,592

[22] Filed: Dec. 19, 1977

[51] Int. Cl.² ............................................. G06F 1/00
[52] U.S. Cl. .................................................. 364/900
[58] Field of Search ... 364/200 MS File, 900 MS File, 364/707

[56] References Cited

U.S. PATENT DOCUMENTS

| 3,769,621 | 10/1973 | Osborne | 364/200 |
|---|---|---|---|
| 3,774,164 | 11/1973 | Osterberg et al. | 364/200 |
| 3,892,957 | 7/1975 | Bryant | 364/200 |
| 3,941,989 | 3/1976 | McLaughlin et al. | 364/707 |
| 4,080,659 | 3/1978 | Francini | 364/200 |

*Primary Examiner*—Raulfe B. Zache
*Attorney, Agent, or Firm*—Anthony F. Cuoco

[57] ABSTRACT

For use with a digital computer system utilizing a processing unit having a higher computational capability than required, means for removing power from system components not required to remember computational variables when the processing unit has completed its prescribed tasks.

6 Claims, 3 Drawing Figures

4,171,539

POWER STROBED DIGITAL COMPUTER SYSTEM

BACKGROUND OF THE INVENTION

1. Field of the Invention

This invention relates generally to digital computer systems and particularly to digital computer systems using processing units having a higher computational capability than required to perform the system tasks. More particularly, this invention relates to means for power strobing the digital computer system to reduce system power utilization.

2. Description of the Prior Art

Very often digital computer systems, which may be of the type used for guiding the flight of an aircraft, use processing units which have a higher computational capability than that required to perform the system tasks. These processing units are used because they are readily available, they generally do not cost more than processing units with a lesser computational capacity and design effort to provide a specific processing unit for the application at hand is minimized. This situation suggests that when the processing unit has completed its prescribed tasks all power should be removed from any system components which are not needed to remember computational variables. Such an arrangement has the advantages of reducing system power utilization and increasing system reliability due to lower operating temperatures resulting from the reduced power utilization.

SUMMARY OF THE INVENTION

This invention contemplates a power strobing implementation for use with a digital computer system of the type described wherein a real time clock which determines the rate of computational sampling in the system sets a bistable multivibrator (flip-flop) which applies power to the power strobed components of the system. The processing unit performs its required computations and when it has finished its task it provides an "end of compute" signal which resets the flip-flop to remove power through a switching device from the power strobed components.

One object of this invention is to provide a digital computer system which has a high reliability while utilizing less power than systems of the type now known in the art.

Another object of this invention is to provide a digital computer system of the type described including a power strobed inplementation whereby power is removed from system components which are not required to remember computational variables after the system processing unit has completed its tasks.

Another object of this invention is to accomplish the power strobing implementation by arranging the processing unit to provide a signal when its required tasks are completed, and which signal is utilized to remove power from the power strobed components of the system.

The foregoing and other objects and advantages of the invention will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

DESCRIPTION OF THE INVENTION

Figure 1:
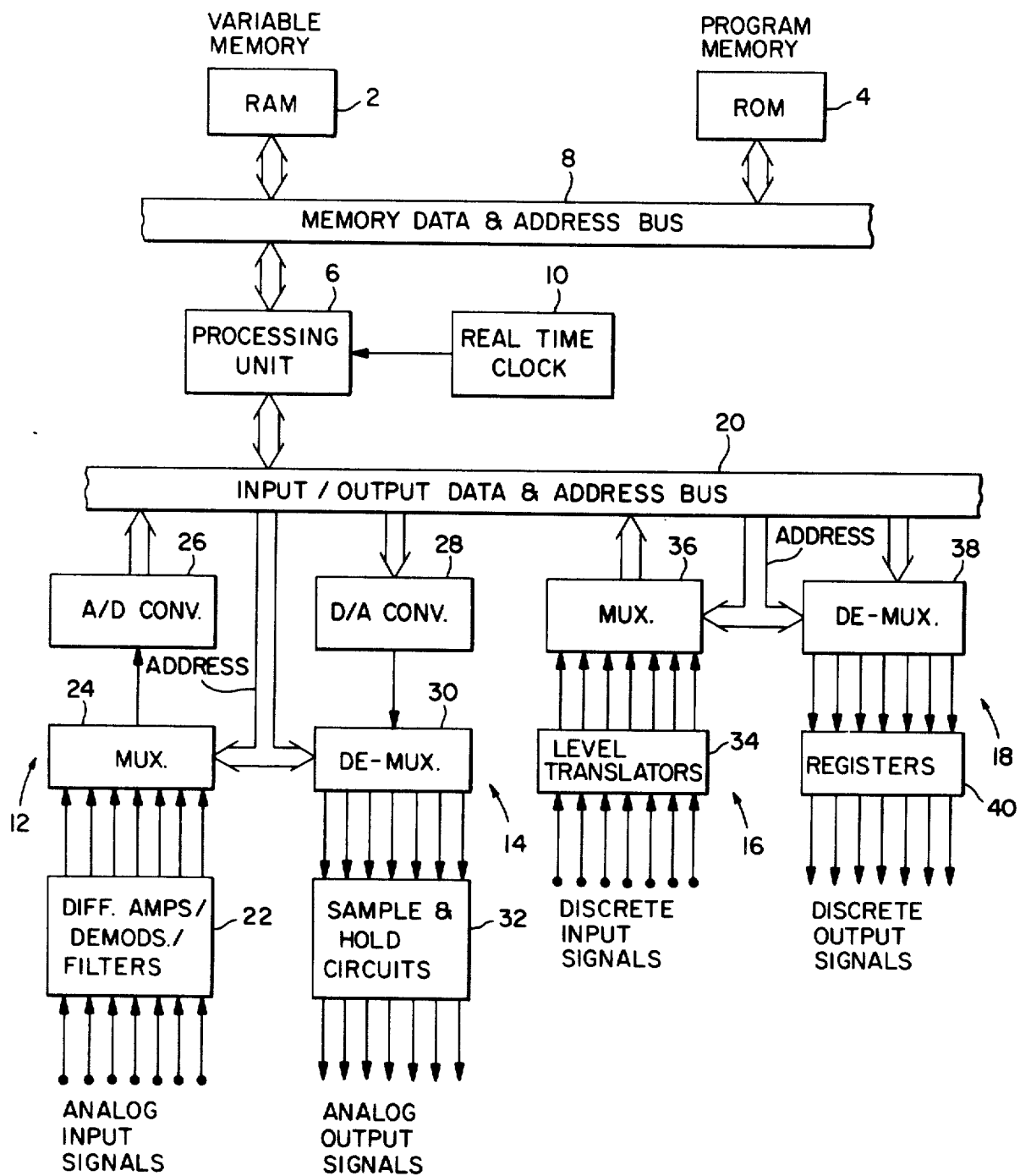
FIG. 1 is a typical digital computer system with which the disclosed power strobed implementation may be used.

With reference to FIG. 1, a typical digital computer system is shown as including a random access memory device (RAM) 2 and a read only memory device (ROM) 4. RAM 2 provides a variable memory and ROM 4 provides a program memory to a processing unit 6 through memory data and address bus 8. A real time clock 10 provides a signal which is applied to processing unit 6 for determining the rate of computation sampling in the digital computer system.

An analog input signal channel designated generally by the numeral 12, an analog output signal channel designated generally by the numeral 14, a discrete input signal channel designated generally by the numeral 16 and a discrete output signal channel designated generally by the numeral 18 are connected to processing unit 6 through an input/output data and address bus 20.

Analog input signal channel 12 receives a plurality of analog input signals which may be, for purposes of illustration, provided by gyros or other flight condition sensors included in a digital flight control system. The analog signals are applied through appropriate differential amplifiers, demodulators and filters designated generally by the numeral 22 and applied therefrom to a multiplexer 24. Multiplexer 24 provides a signal which is applied to an analog to digital converter 26 and therefrom to processing unit 6 through input/output data and address bus 20.

Analog output channel 14 includes a digital to analog converter 28 connected to processing unit 6 through bus 20 for providing an analog signal which is applied to a demultiplexer 30. Demultiplexer 30 provides a plurality of signals which are applied to sample and hold circuits designated generally by the numeral 32 to provide analog output signals.

Discrete input signal channel 16 receives a plurality of signals which may, for purposes of illustration, correspond to discrete levels, i.e., logic "high" or logic "low", of corresponding analog input signals. The discrete signals are applied to level translators designated generally by the numeral 34 and therefrom to a multiplexer 36 connected to processing unit 6 through input/output data and address bus 20.

Discrete output signal channel 18 includes a demultiplexer 38 connected to processing unit 6 through bus 20. Demultiplexer 38 provides a plurality of signals which are applied to registers designated generally by the numeral 40 for providing a corresponding plurality of discrete output signals.

As heretofore noted the digital computer system described with reference to FIG. 1 is a system of the type known in the art and only as much of the system as is necessary to describe the disclosed power strobing implementation has been illustrated and described.

It will be understood that the only components shown in FIG. 1 that cannot be power strobed, i.e., that must receive power at all times, are those that have to retain their particular values, such as RAM 2, analog differential amplifiers/demodulators/filters 22, sample and hold circuits 32 and output registers 34. All other system components including processing unit 6, ROM 4, A/D converter 26, D/A converter 28, multiplexers 24 and 36, demultiplexers 30 and 38, and level translators 34 can be power strobed, i.e., the power to the components may be interrupted on a duty cycle basis as will be described with reference to FIGS. 2 and 3.

Figure 2:
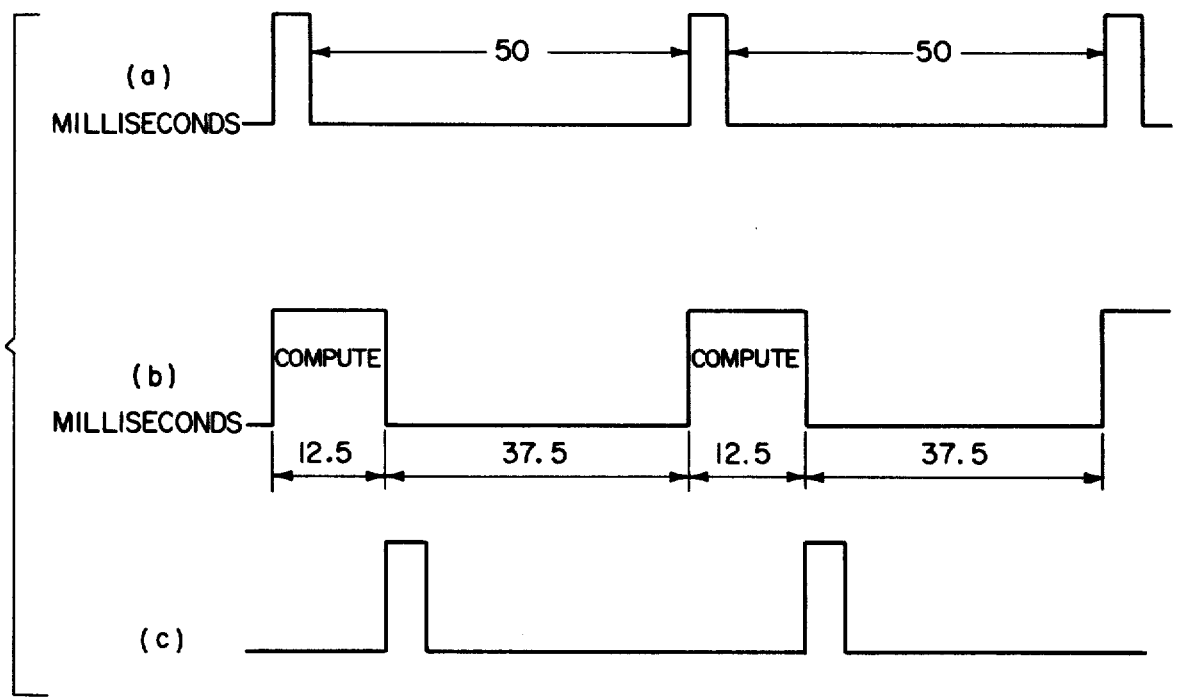
FIGS. 2 (a), (b) and (c) are a graphical representations showing computation sampling signals, computation cycles and power strobing signals provided according to the invention.

With reference now to FIG. 2, a one-quarter duty cycle computation usage for the digital computer system shown in FIG. 1 is shown for purposes of illustration. A typical computation cycle is shown in FIG. 2, wherein real time clock 10 (FIG. 1) provides a computation sampling signal to processing unit 6 every fifty milliseconds as shown in (a). FIG. 2, (b) shows the real time usage of processing unit 6, wherein the processing unit is computing for twelve and one-half milliseconds out of the fifty milliseconds and is idle for thirty seven and one-half milliseconds, for a one-quarter duty cycle as aforenoted.

Figure 3:
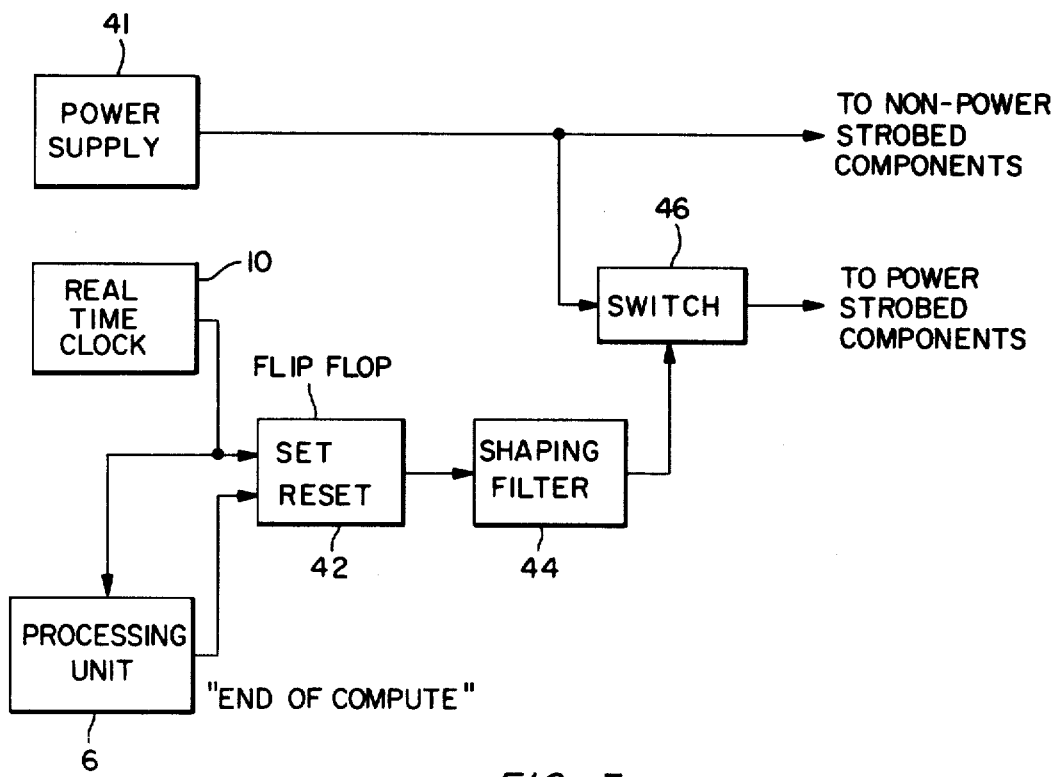
FIG. 3 is a block diagram specifically illustrating the power strobing implementation of the invention.

The invention as described with reference to FIG. 3 provides a power strobe signal at the end of each computing cycle as shown in FIG. 2 (c) for power strobing appropriate system components to remove power therefrom and to thereby accomplish the purposes of the invention.

With reference to FIG. 3 a suitable power supply is designated by the numeral 41. Power supply 41 provides power to all of the components shown in FIG. 1. This power is applied directly to the components not power strobed, i.e., RAM 2, differential amplifiers/demodulators/filters 22, registers 30 and sample and hold circuits 32, and is applied through a switch 46, which may be of the transistor type, and controls power to the remaining components shown in FIG. 1 as heretofore enumerated and as will be hereinafter described.

Real time clock 10 continuously provides a signal which determines the rate of computation sampling for the digital computer system, and which signal is shown graphically in FIG. 2 (a). This signal is applied to processing unit 6 and to the "set" terminal of a bistable multivibrator or flip-flop 42 for setting the flip-flop so that power is applied to the power strobed components through a shaping filter 48 and switch 46 which is closed by the output of flip-flop 42 which is in one state.

Processing unit 6 proceeds to perform its required computations or tasks. When these tasks are completed, processing unit 6 provides an "end of compute" signal which is applied to the "reset" terminal of flip-flop 42. The arrangement is such that switch 46 which had previously been closed for passing power from power supply 41 to the power strobed components of the digital computer system is opened when flip-flop 42 is reset and provides an output in another state. With the switch thus opened the transmission of power from the power supply 41 to the power strobed components of the system is interrupted.

In this connection it is noted that shaping filter 44 is used to shape the rise and fall times of the power switching signal from flip-flop 42 to eliminate electro-magnetic interference (EMI) and transient voltage stresses on the power strobed components.

The arrangement is such that at the end of its computation cycle, processing unit 6 must store all useful information in its general process accumulators included in RAM 2 before the "end of compute" signal is provided.

It wil thus be seen from the foregoing description of the invention with reference to the drawings that an implementation has been provided for removing power from certain components of a digital computer system during the time that these components are not required for computational purposes. The implementation herein disclosed enables the use of readily available processing units and provides the system designer with a degree of latitude in that a processing unit with a computational capability greater than that required is already included in the system for design expansion purposes and the like. Moreover, with an implementation as described it has been found that the digital computer system power may be significantly reduced which enhances system reliability due to decreased operating temperatures resulting therefrom.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A digital computer system comprising:
   a processing unit;
   a plurality of system components connected to the processing unit for applying computational variables thereto;
   timing means for providing a signal which controls the computational cycle of the processing unit;
   the processing unit providing a signal when its computational cycle has been completed;
   a power supply for applying power to the system components;
   certain of the system components requiring power only during the computational cycle of the processing unit; and
   means for applying power to the certain system components only during the computational cycle of the processing unit including means connected to the timing means and to the processing unit for providing a signal in a first state in response to the signal provided by the timing means and for providing a signal in a second state in response to the signal provided by the processing unit, and means connected to the power supply and to the means connected to the timing means and to the processing unit, and responsive to the signal in the first state for applying power to the certain system components and responsive to the signal in the second state for interrupting power to said components.

2. A digital computer system as described by claim 1, wherein the means connected to the timing means and to the processing unit for providing a signal in a first state in response to the signal provided by the timing unit and for providing a signal in a second state in response to the signal provided by the processing unit includes:
   oscillator means being set by the signal provided by the timing means for providing the signal in the first state, and being reset by the signal from the processing unit for providing the signal in the second state.

3. A digital computer system as described by claim 1, wherein the means connected to the power supply and to the means connected to the timing means and to the processing unit, and responsive to the signal in the first state for applying power to the certain system components and responsive to the signal in the second state for interrupting power to said components includes:

switching means closed in response to the signal in the first state and opened in response to the signal in the second state.

4. A digital computer system as described by claim 2, including:

signal shaping means connected to the oscillator for shaping the rise and fall times of the signals in the first and second states provided thereby.

5. A digital computer system as described by claim 1, wherein:

the timing means provides a signal at a predetermined interval for initiating the computational cycle of the processing unit at said interval;

the duration of the processing unit computational cycle is a fraction of said interval; and the signal provided by the processing unit is provided at the end of the fractional interval.

6. A digital computer system as described by claim 5, wherein:

power is provided to the certain system components during the fraction of the interval and is removed from said components during the remainder of the interval.

* * * * *